(12) United States Patent
Bonagiri et al.

(10) Patent No.: US 9,607,062 B1
(45) Date of Patent: *Mar. 28, 2017

(54) DATA LOCALITY IN DATA INTEGRATION APPLICATIONS

(71) Applicant: International Business Machines Corporation, Armonk, NY (US)

(72) Inventors: Krishna K. Bonagiri, Ambajipet (IN); Eric A. Jacobson, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/945,476

(22) Filed: Nov. 19, 2015

(51) Int. Cl.
*G06F 17/30* (2006.01)

(52) U.S. Cl.
CPC .. *G06F 17/30563* (2013.01); *G06F 17/30194* (2013.01)

(58) Field of Classification Search
CPC ................ G06F 17/30563; G06F 17/30194
USPC ........................................ 707/602
See application file for complete search history.

(56) References Cited

U.S. PATENT DOCUMENTS

| | | | | |
|---|---|---|---|---|
| 8,412,682 | B2 * | 4/2013 | Zheng | G06F 3/0608 707/687 |
| 8,972,337 | B1 * | 3/2015 | Gupta | G06F 17/30563 707/602 |
| 9,063,992 | B2 | 6/2015 | Bhide et al. | |
| 9,462,058 | B1 * | 10/2016 | Bonagiri | H04L 67/1097 |
| 2004/0260898 | A1 * | 12/2004 | Stanley | G06F 11/1451 711/162 |
| 2005/0235274 | A1 * | 10/2005 | Mamou | G06Q 10/10 717/136 |
| 2007/0016596 | A1 * | 1/2007 | Fabret | G06F 17/30566 |
| 2008/0120129 | A1 * | 5/2008 | Seubert | G06Q 10/06 705/35 |
| 2009/0018996 | A1 | 1/2009 | Hunt et al. | |
| 2011/0060157 | A1 | 3/2011 | Glaser et al. | |
| 2011/0219208 | A1 * | 9/2011 | Asaad | G06F 15/76 712/12 |
| 2012/0311581 | A1 | 12/2012 | Balmin et al. | |
| 2013/0290957 | A1 * | 10/2013 | Li | G06F 9/5066 718/1 |
| 2013/0318525 | A1 | 11/2013 | Palanisamy et al. | |

(Continued)

OTHER PUBLICATIONS

Bonagiri et al., "Data Locality in Data Integration Applications", U.S. Appl. No. 15/050,565, filed Feb. 23, 2016, 32 pages.

(Continued)

*Primary Examiner* — Noosha Arjomandi
(74) *Attorney, Agent, or Firm* — Isaac J. Gooshaw (57) ABSTRACT

A computer-implemented method includes identifying a logical node. The logical node is associated with one or more source stages. The computer-implemented method further includes identifying one or more file block components. The one or more file block components include a retrieval target for at least one of the one or more source stages. The computer-implemented method further includes identifying one or more physical nodes and determining, for each of the one or more physical nodes, a degree value. A corresponding computer program product and computer system are also disclosed.

7 Claims, 8 Drawing Sheets

(56) References Cited

U.S. PATENT DOCUMENTS

| | | | | |
|---|---|---|---|---|
| 2014/0059290 | A1* | 2/2014 | Ross | G06F 17/302 |
| | | | | 711/112 |
| 2014/0059310 | A1* | 2/2014 | Du | G06F 3/065 |
| | | | | 711/162 |
| 2014/0201129 | A1* | 7/2014 | Gupta | G06F 17/30592 |
| | | | | 707/602 |
| 2014/0245298 | A1 | 8/2014 | Zhou et al. | |
| 2014/0358845 | A1 | 12/2014 | Mundlapudi et al. | |
| 2015/0081619 | A1 | 3/2015 | Brown et al. | |
| 2015/0254330 | A1 | 9/2015 | Chan et al. | |
| 2016/0266801 | A1* | 9/2016 | Marcelin Jemenez | G06F 17/30 |

OTHER PUBLICATIONS

IBM, "Appendix P: IBM Patents or Patent Applications Treated as Related", 2 pages, dated Feb. 24, 2016.

Chung et al., "Maximizing data locality in distributed systems", Journal of Computer and System Sciences 72 (2006) 1309-1316, Available online Aug. 24, 2006, pp. 1309-1316, doi:I0.1016/jjcss. 2006.07.001, © 2006 Elsevier Inc.

Gu et al., "Towards Efficient and Simplified Distributed Data Intensive Computing*", IEEE Transactions on Parallel and Distributed Systems, Manuscript ID, Manuscript received Jan. 2, 2010, Revised on Jun. 18, 2010 and Aug. 19, 2010, pp. 1-12, *a shorter version of this paper has been published at the 2nd Workshop on Many-Task Computing on Grids and Supercomputers (MTAGS 2009).

CloverETL Rapid Data Integration, "Products", pp. 1-4, printed on Sep. 24, 2015, <http://www.cloveretl.com/products>.

IBM®, "IBM InfoSphere Information Server VII.5 delivers new integration and governance features", IBM United States Software Announcement 215-345, dated Sep. 15, 2015, 18 pages, Evidence of Grace Period Use or Sale, <http://www-01.ibm.com/common/ssi/cgi-bin/ssialias?infotype=AN&subtype=CA&htmlfid=897/ENUS215-345&appname=USN>.

ip.com, "A Method of Expeditiously Detecting and Partitioning Disks for Commissioning Slaves in Hadoop Cluster", Jun. 13, 2013, An IP.com Prior Art Database Technical Disclosure, IP.com No. 000228209, retrieved from the Internet at <URL: http://null/IPCOM/000228209>, Total 7 pp.

ip.com, "Method for Generating Secure and Highly Available Data for Hadoop Processing", Sep. 10, 2014, An IP.com Prior Art Database Technical Disclosure, IP.com No. 000238663, retrieved from the Internet at <URL: http://null/IPCOM/000238663, Total 6 pp.

ip.com, "System and method for Hadoop Application Monitoring", Sep. 18, 2013, An IP.com Prior Art Database Technical Disclosure, IP.com No. 000230912, retrieved from the Internet at <URL: http://null/IPCOM/000230912>, Total 4 pp.

Mell, P. and T. Grance, "Effectively and Securely Using the Cloud Computing Paradigm", [online], Oct. 7, 2009 retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Fiori J., "Leverage Existing File-based Applications with Hadoop", [online], May 13, 2013. [Retrieved on Jun. 15, 2015]. Retrieved from the Internet at <URL: https://www.mapr.com/blog/leverage-existing-file-based-applications-hadoop#.VX8_XEbQiuw>, Total 18 pp.

Mirantis, A.L., "Improving Data Processing Performance with Hadoop Data Locality", [online], Feb. 28, 2014. [Retrieved on Jun. 15, 2015]. Retrieved from the Internet at <URL: https://www.mirantis.com/blog/improving-data-processing-performance-hadoop-data-locality/>, Total 9 pp.

Pucher A., "Auto-Scaling with Apache Helix and Apache YARN", [online], posted on Sep. 24, 2013. [Retrieved on Jun. 15, 2015]. Retrieved from the Internet at <URL: https://engineering.linkedin.com/cluster-management/auto-scaling-apache-helix-and-apach . . . >, Total 5 pp.

ip.com, "A Service-oriented Methodology of Server Resources Allocation and Relocation with Dynamically Expanded Resources Manager", Dec. 5, 2013, an IP.com Prior Art Database Technical Disclosure, IP.com No. 000233271, retrieved from the Internet at <URL: http://null/IPCOM/000233271>, Total 16 pp.

Vavilapalli, V.K., A.C. Murthy, C. Douglas, S. Agarwal, M. Konar, R. Evans, T. Graves, J. Lowe, H. Shah, S. Seth, B. Saha, C. Curino, O. O'Malley, S. Radia, B. Reed, and E. Baldeschwieler, "Apache Hadoop YARN: Yet Another Resource Negotiator", SoCC'13, Oct. 1-3, 2013, Santa Clara, California, USA, ACM 978-1-4503-2428-1, © 2013 ACM, Inc., Total 16 pp.

Hogqvist, M., "Architecture and Self-Tuning of a DISC-system", 23rd IEEE International Parallel & Distributed Processing Symposium (IPDPS), 2009, IEEE Computer Society, Total 3 pp.

Bonagiri et al., "Dynamic Node Group Allocation", U.S. Appl. No. 14/740,050, filed Jun. 15, 2015, 40 pages.

IBM, "Appendix P: IBM Patents or Patent Applications Treated as Related", 2 pages, dated Jan. 21, 2016.

* cited by examiner

| Physical Node No. | Degree Value |
|---|---|
| 611 — 1 | 3 |
| 612 — 2 | 2 |
| 613 — 3 | 1 |

DATA LOCALITY IN DATA INTEGRATION APPLICATIONS

BACKGROUND

The present invention relates generally to the field of data integration applications, and more particularly to data locality in those applications.

In some data integration applications, developers and/or users need to extract data from one or more sources (for instance as part of one or more Extract-Transform-Load jobs). In computer processes that rely on extracting data from one or more sources as part of their operation (e.g., data warehousing processes), the cost of such data extraction could be considerable. Developers and users of those computer processes continue to face challenges with the costs incurred as a result of inefficient data extraction approaches. The present invention may be used to enhance the functionalities of data processing and storage frameworks.

SUMMARY

A computer-implemented method includes identifying a logical node. The logical node is associated with one or more source stages. The computer-implemented method further includes identifying one or more file block components. The one or more file block components include a retrieval target for at least one of the one or more source stages. The computer-implemented method further includes identifying one or more physical nodes and determining, for each of the one or more physical nodes, a degree value. A corresponding computer program product and computer system are also disclosed.

DETAILED DESCRIPTION

Figure 1:
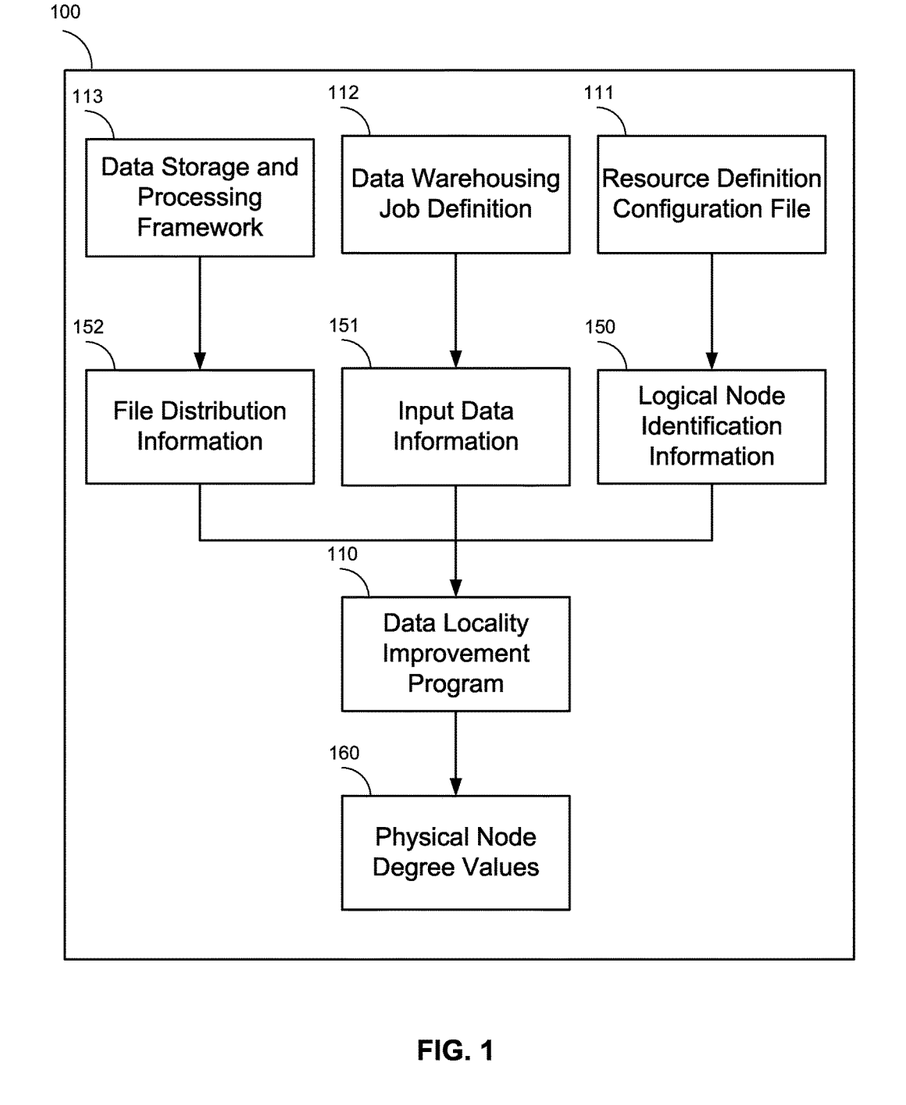
FIG. 1 is a block diagram of one embodiment of a computer system environment suitable for operation of a data locality improvement program, in accordance with at least one embodiment of the present invention.

FIG. 1 is a block diagram of one embodiment of a computer system environment 100 suitable for operation of a data locality improvement program 110, in accordance with at least one embodiment of the present invention. In the computer system environment 100 depicted in FIG. 1, a resource definition configuration file 111 provides one or more pieces of "logical node identification information" 150. In at least some embodiments, logical node identification information 150 may comprise any one or more pieces of information that, directly or when interpreted (alone or in combination with other one or more pieces of information), define one or more logical nodes, and/or identify and/or determine one or more logical nodes. In at least some embodiments, a logical node (aka a processing node) comprises all or a portion of a physical node. In at least some of those embodiments, the resource definition configuration file 111 may (e.g., through logical node identification information 150) define one logical node for a physical node or define more than one logical node for a physical node. In at least some embodiments, a logical node is associated with one or more data processing stages including at least one source stage.

In the computer system environment 100 depicted in FIG. 1, a data warehousing job definition 112 provides one or more pieces of input data information 151. In at least some embodiments, a data warehousing job definition 112 comprises one or more pieces of information about one or more data warehousing job stages carried out on one or more logical nodes. In at least some embodiments, the input data information 151 comprise any one or more pieces of information that, directly or when interpreted (alone or in combination with other one or more pieces of information), identify one or more file block components as well as one or more logical nodes that access the one or more file block components during the regular, non-exceptional executions of one or more source stages in one or more data warehousing jobs carried out on the one or more logical nodes.

In the computer system environment 100 depicted in FIG. 1, a data storage and processing framework 113 provides one or more pieces of file distribution information 152. In at least some embodiments, a data storage and processing framework 113 is any combination of one or more software components that, in whole or in part, manage processing and/or storage of one or more pieces of data, and/or provide one or more indications that, directly or when interpreted (alone or in combination with other one or more pieces of information), can provide information about the processing and/or storage of one or more pieces of data. In some embodiments, a data storage and processing framework 113 comprises one or more software frameworks for distributed storage and distributed processing of data (such as Apache Hadoop®). In at least some embodiments, the file distribution information 152 comprise any one or more pieces of information that, directly or when interpreted (alone or in combination with other one or more pieces of information), identify and/or determine one or more file block components and the one or more physical nodes that have local access to the one or more file block components.

In the computer system environment 100 depicted in FIG. 1, the data locality improvement program 110 uses the logical node identification information 150 (e.g., to identify one or more logical nodes), the input data information 151 (e.g., to determine which one or more file block components comprise a retrieval target of at least one of the one or more source stages associated with each logical node), and the file distribution information 152 (e.g., to determine which one or more physical nodes have local access to the one or more file block components) to determine a degree value for each of the one or more physical nodes. In at least some embodiments, the degree value of a physical node is determined based on the number of desired file block components (e.g., the one or more file block components that comprise a retrieval target of at least one of the one or more source stages associated with an identified logical node) that the physical node has local access to (e.g., the number of desired file block components stored on the physical node). In at least some embodiments, the degree value of a physical node is an indication of the number of desired file block components to which the physical node has local access.

Figure 2:
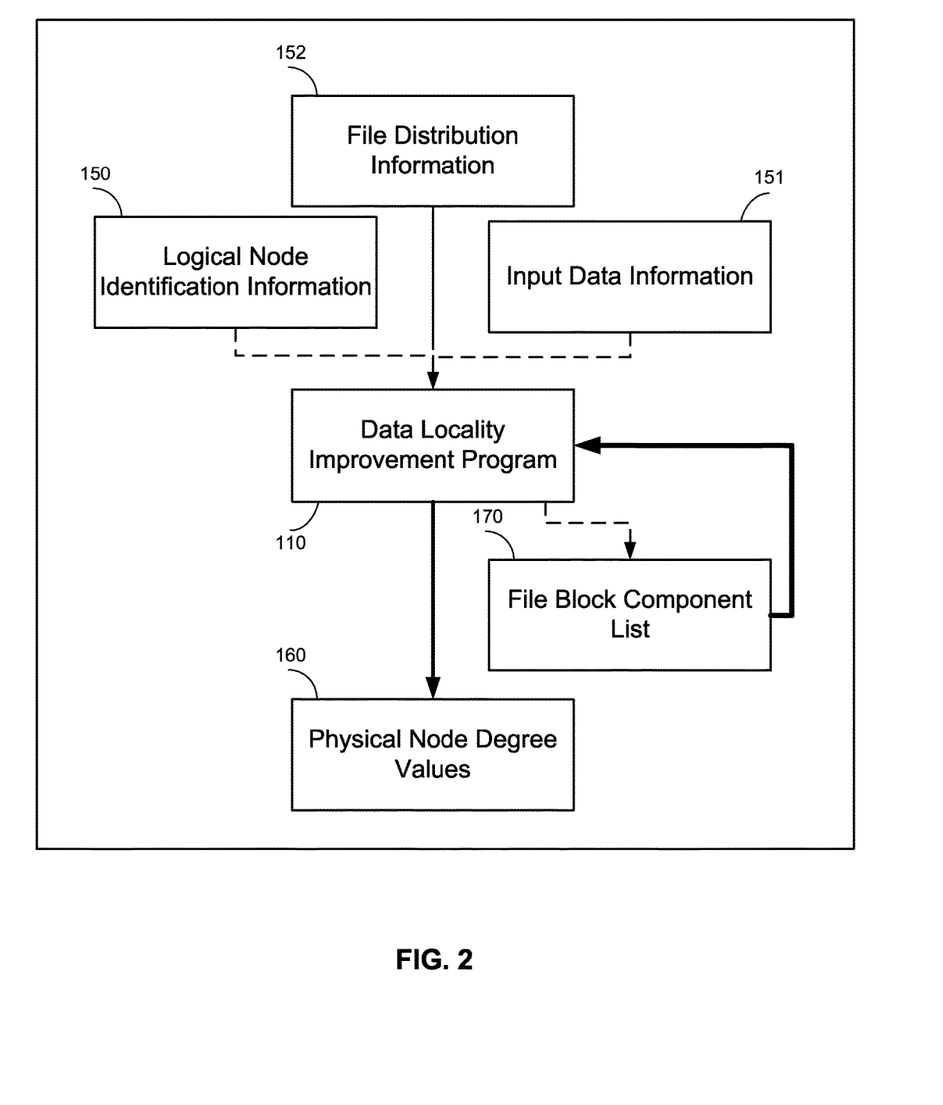
FIG. 2 is a data-flow diagram of a data locality improvement program, in accordance with at least one embodiment of the present invention.

FIG. 2 is a data-flow diagram of a data locality improvement program 110, in accordance with at least one embodiment of the present invention. In the embodiment depicted in FIG. 2, the data locality improvement program 110 uses the logical node identification information 150 to identify a logical node. The data locality improvement program 110 uses the input data information 151 to determine one or more desired file block components that comprise a retrieval target of at least one of the one or more source stages associated with the logical node. The data locality improvement program generates a file block component list 170 that comprises an indication of the one or more desired file block components. The data locality improvement program 110 uses the file block component list 170 and the file distribution information 152 to determine an indication of how many of the desired file block components each physical node has local access to (i.e., the degree value of each physical node 160).

Figure 3:
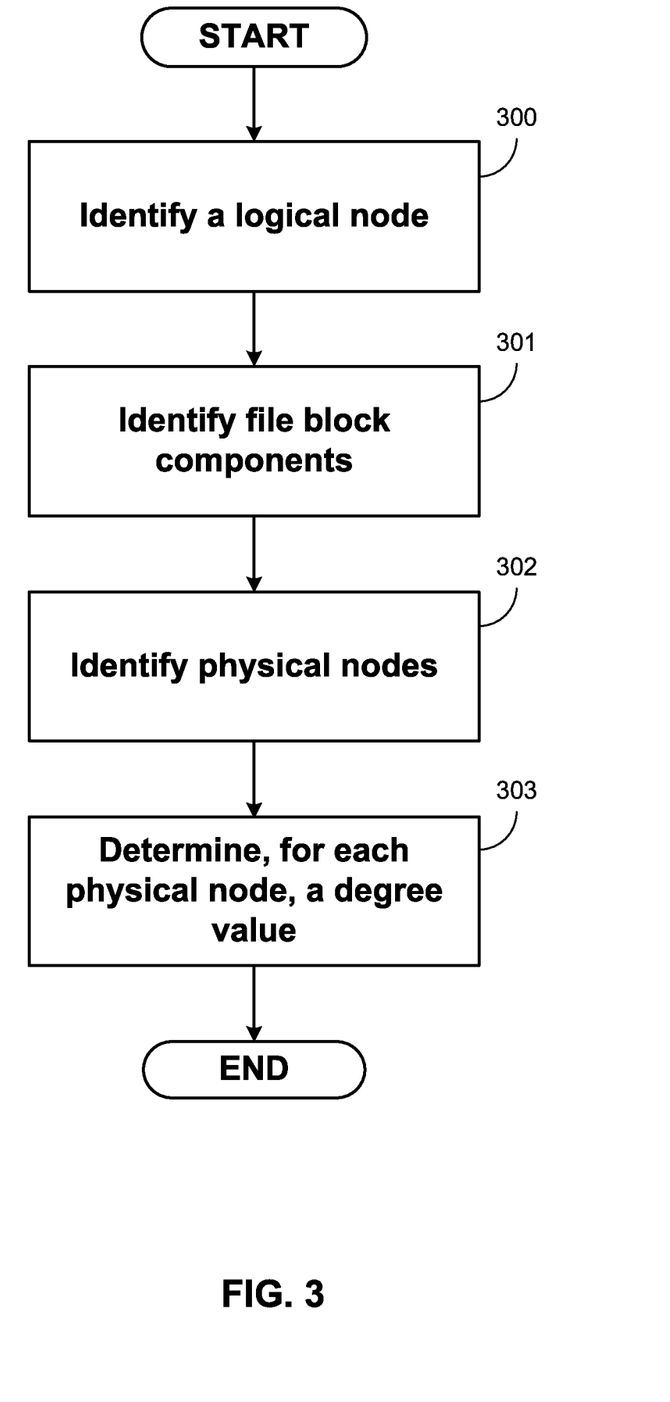
FIG. 3 is a flow-chart diagram of a data locality improvement program, in accordance with at least one embodiment of the present invention.

FIG. 3 is a flow-chart diagram of a data locality improvement program, in accordance with at least one embodiment of the present invention. At step 300, the program identifies a logical node associated with one or more source stages. At step 301, the program identifies one or more file block components, where the file block components comprise a retrieval target of at least one of the one or more source stages. At step 302, the program identifies one or more physical nodes. At step 303, the program determines, for each of the one or more physical nodes, a degree value.

Figure 4:
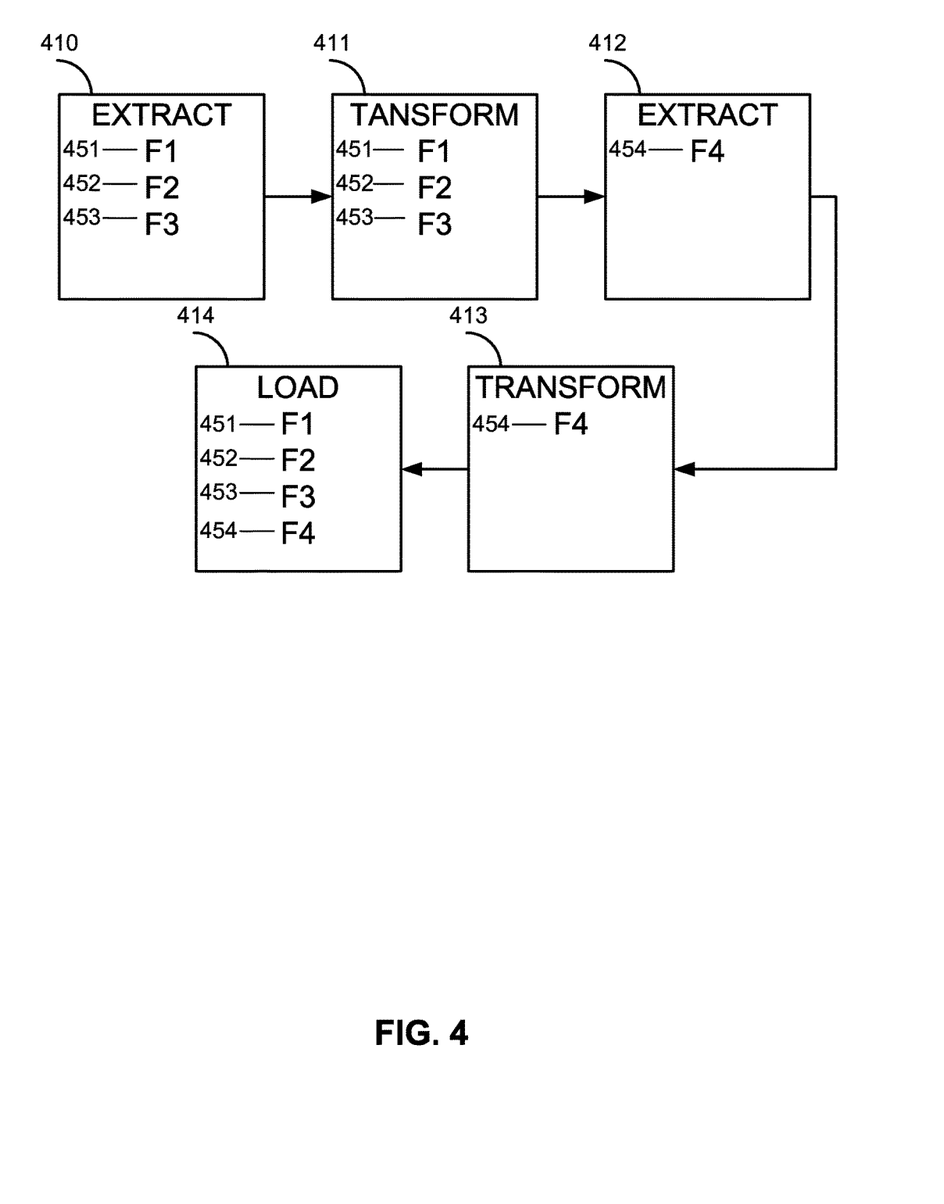
FIG. 4 is an operational example of a chain of data processing stages, in accordance with at least one embodiment of the present invention.

FIG. 4 is an operational example of a chain of data processing stages, in accordance with at least one embodiment of the present invention. The chain of data processing stages depicted in FIG. 4 will be executed on at least one logical node. In the chain of data processing stages depicted in FIG. 4, the source stages 410 and 412 are marked by the keyword EXTRACT; the transformation stages 411 and 413 are marked by the keyword TRANSFROM; and the destination stage 414 is marked by the keyword LOAD.

In the chain of data processing stages depicted in FIG. 4, the source stage 410 extracts three file block components: F1 451, F2 452, and F3 453. The source stage 412 extracts one file block component: F4 454. The transformation stage 411 transforms file block components F1 451, F2 452, and F3 453, and transformation stage 413 transforms file block components F4 454. The destination stage 414 loads file block components F1 451, F2 452, F3 453, and F4 454 to a destination server. During regular, non-exceptional executions, the data processing stages depicted in FIG. 4 are transformed sequentially as depicted in that figure (i.e., first, source stage 410 is executed; then, transformation stage 411 is executed; afterward, source stage 412 is executed; next, transformation stage 413 is executed; and last, destination stage 414 is executed). In some embodiments, a chain of data processing stages comprises one or more destination stages that do not load to one or more destination servers all of one or more file block components extracted during one or more source stages executed on the logical node. In some embodiments, a chain of data processing stages comprises one or more transformation stages that do not transform all of one or more file block components extracted during the one or more source stages. In some embodiments, a chain of data processing stages comprises one or more transformation stages and/or one or more destination stages that do not operate on (transform and/or load to one or more destination servers) all of one or more file block components extracted during the one or more source stages. In some embodiments, one or more destination stages loads one or more file block components to one or more destination servers.

Figure 5:
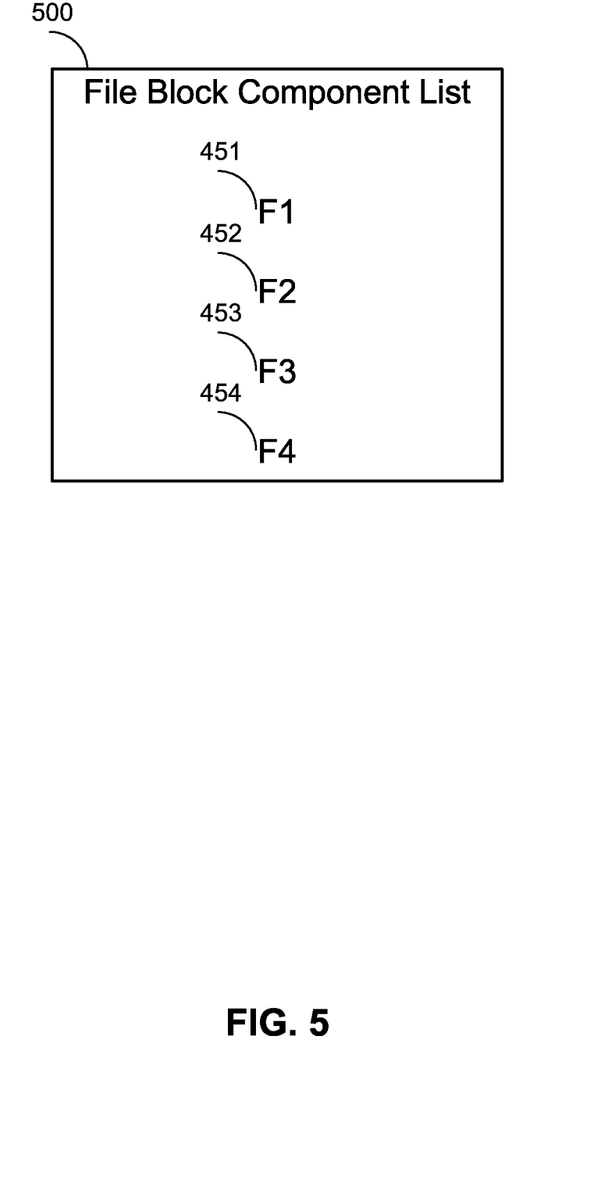
FIG. 5 is an operational example of a file block component list, in accordance with at least one embodiment of the present invention.
Figure 6A:
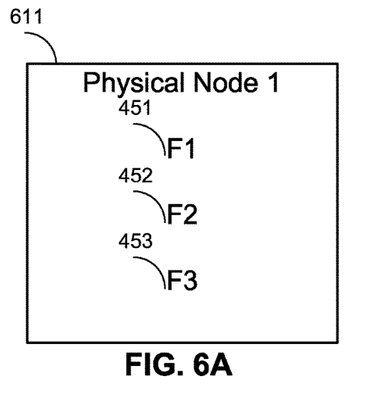
FIGS. 6A, 6B, 6C, and 6D are operational examples of four physical nodes, in accordance with at least one embodiment of the present invention.
Figure 6B:
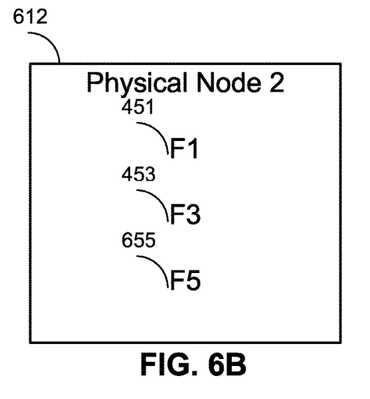
Figure 6C:
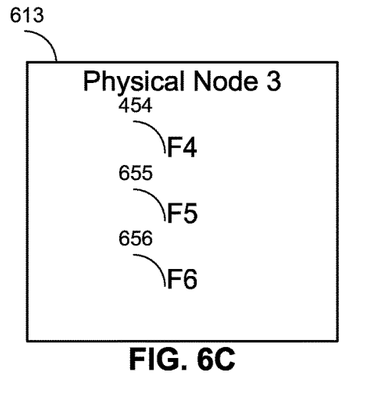
Figure 6D:
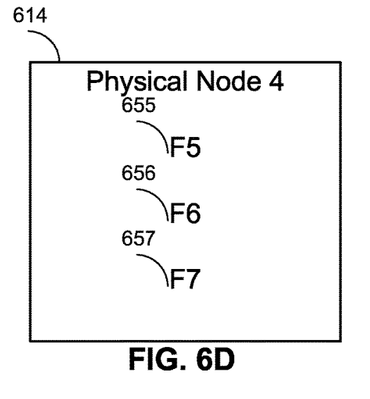

FIG. 5 is an operational example of a file block component list 500, in accordance with at least one embodiment of the present invention. The file block component list 500 depicted in FIG. 5 includes indications of all the desired file block components that were the retrieval target of at least one of the source stages depicted in FIG. 4, where the source stages are associated with a single logical node. As such, the file block component list 500 depicted in FIG. 5 includes indications of the file block component F1 451 (that was the retrieval target of source stage 410); the file block component F2 452 (that was the retrieval target of source stage 410); the file block component F3 453 (that was the retrieval target of source stage 410); and the file block component F4 454 (that was the retrieval target of source stage 412).

FIGS. 6A, 6B, 6C, and 6D are operational examples of four physical nodes, in accordance with at least one embodiment of the present invention. Physical node 1 611, depicted in FIG. 6A, has local access to the file block component F1 451, the file block component F2 452, and the file block component F3 453, indications of all three of which were on the file block component list 500 depicted in FIG. 5. Physical node 2 612, depicted in FIG. 6B, has local access to the file block component F1 451, the file block component F3 453, and the file block component F5 655, indications of only two of which (i.e., the file block component F1 451 and the file block component F3 453) were on the file block component list 500 depicted in FIG. 5. Physical node 3 613, depicted in FIG. 6C, has local access to the file block component F4 454, the file block component F5 655, and the file block component F6 456, indications of only one of which (i.e., the file block component F4 454) were on the file block component list 500 depicted in FIG. 5. Physical node 4 614, depicted in FIG. 6D, has local access to the file block component F5 655, the file block component F6 656, and the file block component F7 657, indications of none of which were on the file block component list 500 depicted in FIG. 5.

In some embodiments, the data locality improvement program identifies one or more qualified physical nodes from the one or more physical nodes having the degree value of one or more (i.e., having a degree value of at least one). The program further creates a preferred physical node table, where the preferred physical node table comprises, for each of the one or more qualified physical nodes, an identifying indication and an indication of the degree value. The program further sorts the preferred physical node table based on the degree value associated with each of the one or more qualified physical nodes. In at least some of those embodiments, the program identifies one or more qualified physical nodes having a degree value of at least one, creates a table comprising those one or more qualified physical nodes and their degree values, and sorts the table based on the degree values of qualified physical nodes (e.g., in an ascending or descending manner).

Figure 7:
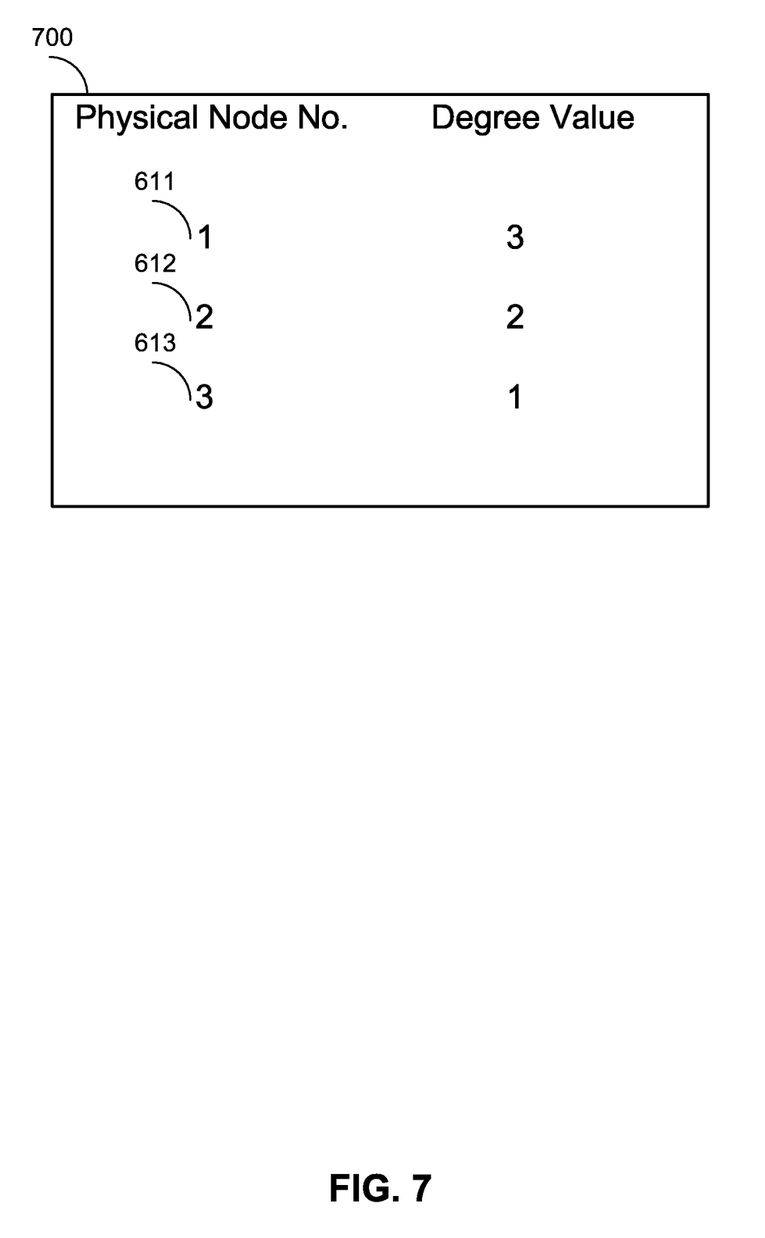
FIG. 7 is an operational example of a ranked preferred physical node table, in accordance with at least one embodiment of the present invention.

FIG. 7 is an operational example of a ranked preferred physical node table 700, in accordance with at least one embodiment of the present invention. The ranked preferred physical node table 700 in FIG. 7 includes indications of physical nodes having a degree value of 1 or more (i.e., physical node 1 611, depicted in FIG. 6A; physical node 2 612, depicted in FIG. 6B; and physical node 3 613, depicted in FIG. 6C) and is sorted in a descending manner. In the ranked preferred physical node table 700 depicted in FIG. 7, physical node 1 611 has a degree value of 3; physical node 2 612 has a degree value of 2; and physical node 3 613 has a degree value of 1.

In some embodiments, the data locality improvement program determines a candidate preferred physical node based on each degree value. In some of those embodiments, the program determines the candidate preferred physical node to be the physical node with the highest degree value. In some of those embodiments, based on the ranked preferred physical node table 700 depicted in FIG. 7, the program chooses the physical node 1 611 to be the candidate preferred physical node, as the physical node 1 611 has the highest degree value of any physical node in the ranked preferred physical node table 700 depicted in FIG. 7. In some embodiments, the program determines the candidate preferred physical node to be the physical node whose indication is at the top of a preferred physical node table sorted in a descending manner (e.g., the ranked preferred physical node table 700 depicted in FIG. 7), or the physical node whose indication is at the bottom of a preferred physical node table sorted in an ascending manner. In some embodiments, the program considers factors in addition to the degree value of physical nodes (e.g., one or more of the availability of one or more physical nodes, the location of one or more physical nodes, the latency of access to one or more physical nodes based on one or more pieces of available statistical information) in determining the candidate preferred physical node.

In some embodiments, the data locality improvement program determines whether the candidate preferred physical node is available for allocation to the logical node, and, responsive to the candidate preferred physical node being available for allocation to the logical node, allocates the candidate preferred physical node to the logical node. In at least some of those embodiments, the program determines if a candidate preferred physical node is available for allocation (e.g., is not currently already allocated to another logical node, is not currently down or otherwise unavailable for service, or is not currently in emergency services mode); if the program determines that a candidate preferred physical node is available for allocation, it allocates the candidate preferred physical node to the logical node. In at least some of those embodiments, based on the ranked preferred physical node table 700 depicted in FIG. 7, if the program determines that the physical node 1 611 is available for allocation, the program allocates the physical node 1 611 to the identified logical node. In some embodiments, the program allocates the candidate preferred physical node to the logical node by creating and/or manipulating one or more data variables associated with the candidate preferred physical node and/or one or more data variables associated with the logical node. In some embodiments, the program determines if a preferred physical node is available for allocation based the value of on one or more data variables associated with the physical node. In an exemplary embodiment, the program determines a physical node is available for allocation if a variable denoting the availability of the physical node for allocation does not return a null value. In some embodiments, the program determines a physical node is available for allocation if an attempt at such allocation is successful within a predetermined and/or predefined amount of time (e.g., within 1.5 seconds).

In some embodiments, responsive to the candidate preferred physical node not being available for allocation to the logical node, the data locality improvement program marks the candidate preferred node as unavailable for allocation to the logical node, and determines an alternative candidate preferred physical node based on each degree value. In at least some of those embodiments, when the program determines that a candidate preferred physical node is unavailable for allocation, the program marks that candidate preferred physical node as unavailable for allocation and determines an alternative candidate preferred physical node based on degree values of the one or more physical nodes. In at least some of those embodiments, based on the ranked preferred physical node table 700 depicted in FIG. 7, if the program determines that physical node 1 611 (i.e., the candidate preferred physical node) is unavailable for allocation, the program determines physical node 2 612 to be the alternative candidate preferred physical node, as physical node 2 612 has the highest degree value of any physical node in the ranked preferred physical node table 700 depicted in FIG. 7 other than physical node 1 611, which is not available for allocation.

In at least some embodiments, the program determines the candidate preferred physical node to be the physical node whose indication is (after excluding qualified physical nodes not available for allocation from consideration) at the top of a preferred physical node table sorted in a descending manner (e.g., the ranked preferred physical node table 700 depicted in FIG. 7), or the physical node whose indication is (after excluding qualified physical nodes not available for allocation from consideration) at the bottom of a preferred physical node table sorted in an ascending manner. In some embodiments, the program considers factors in addition to the degree value of physical nodes (e.g., one or more of the availability of one or more physical nodes, the location of one or more physical nodes, the latency of access to one or more physical nodes based on one or more pieces of available statistical information) in determining the alternative candidate preferred physical node.

In some embodiments, the data locality improvement adopts an iterative approach to identifying a preferred physical node available for allocation to a logical node. In at least some of those embodiments, the data locality improvement program repeats at least the following steps until the program finds a candidate preferred physical node that the program determines is available for allocation to a logical node: (1) determining a candidate preferred physical node; (2) determining if the candidate preferred physical node is available for allocation; (3) responsive to the candidate preferred physical node being available for allocation to the logical node, allocating the candidate preferred physical node to the logical node; (4) responsive to the candidate preferred physical node not being available for allocation to the logical node, marking the candidate preferred node as unavailable for allocation to the logical node; and (5) responsive to the candidate preferred physical node not being available for allocation to the logical node, determining an alternative candidate preferred physical node (i.e., a new candidate preferred physical node, on which the preceding steps 1-3 will be repeated) based on each degree value. In some of those embodiments, the program considers factors in addition to the degree value of physical nodes (e.g., one or more of the availability of one or more physical nodes, the location of one or more physical nodes, the latency of access to one or more physical nodes based on one or more pieces of available statistical information) in determining the candidate preferred physical node.

In an exemplary embodiment adopting the iterative approach noted above, based on the ranked preferred physical node table 700 depicted in FIG. 7, the data locality improvement program determines physical node 1 611 to be the candidate preferred physical node. If the program determines that physical node 1 611 is available for allocation to the identified logical node, the program allocates physical node 1 611 to the identified logical node; if not, the program marks physical node 1 611 to be unavailable for allocation and chooses physical node 2 612 to be the alternative candidate preferred physical node. If the program determines that physical node 2 612 is available for allocation to the identified logical node, the program allocates physical node 2 612 to the identified logical node; if not, the program marks physical node 2 612 to be unavailable for allocation and chooses physical node 3 613 to be the alternative candidate preferred physical node. If the program determines that physical node 3 613 is available for allocation to the identified logical node, the program allocates physical node 3 613 to the identified logical node; if not, the program marks physical node 3 613 to be unavailable for allocation and attempts a request for allocation on another physical node (e.g., another physical node in the cluster of the one or more physical nodes that the program has identified) (and/or marks all three physical nodes as available for allocation and executes the loop again from the point of entry).

The data locality improvement program identifies a logical node at step 300. In some embodiments, identifying the logical node comprises accessing a configuration file. In general, a configuration file may be any file that, in whole or in part, provides one or more pieces of logical node identification information, as defined above. In some embodiments, the program may create a configuration file and/or determine one or more pieces of logical node identification information based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In some embodiments, identifying a logical node comprises communicating with one or more computer (hardware or software) components. In some embodiments, the program identifies and/or determines one or more data processing stages (e.g., one or more source stages) associated with a logical node.

The data locality improvement program identifies one or more file block components at step 301. In at least some embodiments, the one or more file block components comprise a retrieval target for at least one of the one or more source stages associated with the logical node. In at least some embodiments, a retrieval target of one or more source stages is one or more files and/or one or more computer resources that are sought, accessed, and/or retrieved during one or more source stages, in regular, non-exceptional executions. In some embodiments, the program identifies one or more file block components and/or determine one or more pieces of input data information, as defined above, based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In some embodiments, identifying one or more file block components comprises communicating with one or more computer (hardware or software) components. In some embodiments, the program identifies and/or determines one or more properties associated with the one or more file block components (e.g., the sizes of the one or more file block components, the one or more physical nodes on which the one or more file block components are stored, the latest update to the one or more file block components, the type of the one or more file block components, and the format of the one or more file block components).

The data locality improvement program identifies one or more physical nodes at step 302. In some embodiments, the program identifies one or more physical nodes based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In some embodiments, identifying one or more physical nodes comprises communicating with one or more computer (hardware or software) components. In some embodiments, the program identifies and/or determines one or more properties associated with the one or more physical nodes (e.g., the availability of each of the one or more physical nodes for allocation to the logical node, one or more performance properties of each of the one or more physical nodes, and one or more storage properties of each of the one or more physical nodes). In some embodiments, identifying one or more physical nodes comprises issuing one or more computer instructions (e.g., one or more special purpose machine-level instructions defined in the instruction set of one or more computer hardware components) and/or communicating with one or more computer components at the hardware level.

The data locality improvement program determines, for each of the one or more physical nodes, a degree value, at step 303. In at least some embodiments, the degree value of a physical node is determined based on the number of desired file block components (i.e., the one or more file block components that comprise a retrieval target of one or more source stages associated with an identified logical node) that the physical node has local access to. In some embodiments, the degree value of a physical node is an indication of the number of desired file block components that the physical node has local access to. In some embodiments, the program determines, for each of the one or more physical nodes, a degree value based on factors in addition to the number of desired flock block components that the physical node has access to (e.g., factors such as the availability of each of the one or more physical nodes for allocation to the logical node, one or more performance properties of each of the one or more physical nodes, and one or more storage properties of each of the one or more physical nodes). In at least some embodiments, the degree values determined for each of the one or more physical nodes are used to allocate at least one of the one or more physical nodes to the identified logical node. In at least some of those embodiments, one or more data processing stages associated with the identified logical node (including one or more source stages associated with the identified logical node) are executed on the at least one physical node allocated to the identified logical node.

In some embodiments, a physical node has local access to one or more file block components if the file block components are stored on a computer readable storage medium associated with the physical node and/or can be retrieved by the physical node without the need for inter-physical node data transfer and/or without the need to use inter-physical node networking infrastructure. In some embodiments, a physical node has local access to one or more file block components if the costs of extracting the one or more file block components by a logical node to which the physical node is allocated is (based on one or more pieces of statistical information and/or with a predefined level of certainty, such as 90% level of certainty) below a predefined threshold (e.g., a logical node to which the physical node is allocated must be able to access every gigabyte of data in less than 2 seconds).

In some embodiments, the data locality improvement program determines, for each of the one or more physical nodes, a degree value and/or determines one or more pieces of file distribution information, as defined above, based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In some embodiments, determining, for each of the one or more physical nodes, a degree value comprises communicating with one or more computer (hardware or software) components.

In general, one or more steps of different embodiments of the data locality improvement program may be performed based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In general, one or more steps of different embodiments of the data locality improvement program may comprise communicating with one or more computer (hardware or software) components, issuing one or more computer instructions (e.g., one or more special purpose machine-level instructions defined in the instruction set of one or more computer hardware components), and/or communicating with one or more computer components at the hardware level. In some embodiments, the one or more file block components are stored on a distributed file system (e.g., such as the Hadoop® Distributed File System, or HDFS).

In some embodiments, the data locality improvement program operates as an independent software component that takes a data processing job (e.g., a data warehousing job, such as an Extract-Transform-Load job) as an input and returns an enhanced version of the data processing job with at least one logical node among the one or more logical nodes in the computing environment in which the present invention is implemented being bound to one or more physical nodes in that computing environment. In other embodiments, the program may operate as part of a broader data processing software framework operating in the computing environment in which the present invention is implemented, such as a file system management software framework and/or a data warehousing management software framework.

Improving data locality can decrease the cost (e.g., time) of data extraction in computer processes that rely on extracting data from one or more sources. Improving data locality can also decrease the risk that network failures and/or other communication failures may undermine the reliability of data extraction in computer processes that rely on extracting data from one or more sources. Nevertheless, the aforementioned advantages are not required to be present in all of the embodiments of the invention and may not be present in all of the embodiments of the invention.

Figure 8:
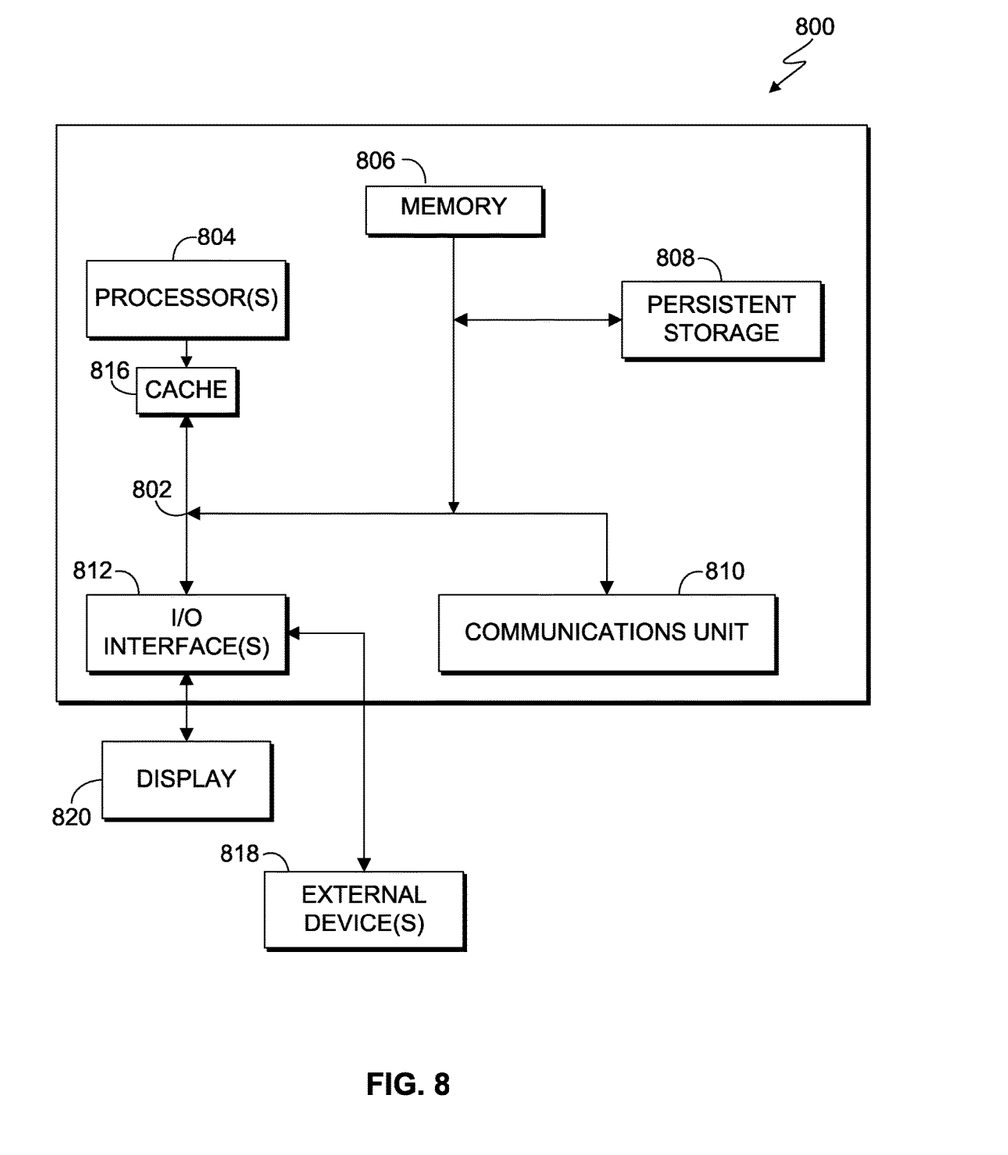
FIG. 8 is a block diagram of a computing apparatus suitable for executing a data locality improvement program, in accordance with at least one embodiment of the present invention.

FIG. 8 is a block diagram depicting components of a computer 800 suitable for executing the data locality improvement program. FIG. 8 displays the computer 800, the one or more processor(s) 804 (including one or more computer processors), the communications fabric 802, the memory 806, the RAM, the cache 816, the persistent storage 808, the communications unit 810, the I/O interfaces 812, the display 820, and the external devices 818. It should be appreciated that FIG. 8 provides only an illustration of one embodiment and does not imply any limitations with regard to the environments in which different embodiments may be implemented. Many modifications to the depicted environment may be made.

As depicted, the computer 800 operates over a communications fabric 802, which provides communications between the cache 816, the computer processor(s) 804, the memory 806, the persistent storage 808, the communications unit 810, and the input/output (I/O) interface(s) 812. The communications fabric 802 may be implemented with any architecture suitable for passing data and/or control information between the processors 804 (e.g., microprocessors, communications processors, and network processors, etc.), the memory 806, the external devices 818, and any other hardware components within a system. For example, the communications fabric 802 may be implemented with one or more buses or a crossbar switch.

The memory 806 and persistent storage 808 are computer readable storage media. In the depicted embodiment, the memory 806 includes a random access memory (RAM). In general, the memory 806 may include any suitable volatile or non-volatile implementations of one or more computer readable storage media. The cache 816 is a fast memory that enhances the performance of computer processor(s) 804 by holding recently accessed data, and data near accessed data, from memory 806.

Program instructions for the data locality improvement program may be stored in the persistent storage 808 or in memory 806, or more generally, any computer readable storage media, for execution by one or more of the respective computer processors 804 via the cache 816. The persistent storage 808 may include a magnetic hard disk drive. Alternatively, or in addition to a magnetic hard disk drive, the persistent storage 808 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of the persistent storage 808.

The communications unit 810, in these examples, provides for communications with other data processing systems or devices. In these examples, the communications unit 810 may include one or more network interface cards. The communications unit 810 may provide communications through the use of either or both physical and wireless communications links. The data locality improvement program may be downloaded to the persistent storage 808 through the communications unit 810. In the context of some embodiments of the present invention, the source of the various input data may be physically remote to the computer 800 such that the input data may be received and the output similarly transmitted via the communications unit 810.

The I/O interface(s) 812 allows for input and output of data with other devices that may operate in conjunction with the computer 800. For example, the I/O interface 812 may provide a connection to the external devices 818, which may include a keyboard, keypad, a touch screen, and/or some other suitable input devices. External devices 818 may also include portable computer readable storage media, for example, thumb drives, portable optical or magnetic disks, and memory cards. Software and data used to practice embodiments of the present invention may be stored on such portable computer readable storage media and may be loaded onto the persistent storage 808 via the I/O interface(s) 812. The I/O interface(s) 812 may similarly connect to a display 820. The display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying a logical node, said logical node being associated with one or more source stages;
   identifying one or more file block components, said one or more file block components comprising a retrieval target for at least one of said one or more source stages;
   identifying one or more physical nodes;
   determining, for each of said one or more physical nodes, a degree value;
   identifying one or more qualified physical nodes from said one or more physical nodes having said degree value of one or more;
   creating a preferred physical node table, said preferred physical node table comprising, for each of said one or more qualified physical nodes, an identifying indication and an indication of said degree value; and
   sorting said preferred physical node table based on said degree value associated with each of said one or more qualified physical nodes.

2. A computer-implemented method comprising:
   identifying a logical node, said logical node being associated with one or more source stages;
   identifying one or more file block components, said one or more file block components comprising a retrieval target for at least one of said one or more source stages;
   identifying one or more physical nodes;
   determining, for each of said one or more physical nodes, a degree value;
   determining a candidate preferred physical node based on each said degree value;
   determining whether said candidate preferred physical node is available for allocation to said logical node; and
   responsive to said candidate preferred physical node being available for allocation to said logical node, allocating said candidate preferred physical node to said logical node.

3. The computer-implemented method of claim 2, further comprising:
   responsive to said candidate preferred physical node not being available for allocation to said logical node:
      marking said candidate preferred physical node as unavailable for allocation to said logical node; and
      determining an alternative candidate preferred physical node based on each said degree value.

4. A computer program product comprising one or more computer readable storage media and program instructions stored on said one or more computer readable storage media, said program instructions comprising instructions to:
   identify a logical node, said logical node being associated with one or more source stages;
   identify one or more file block components, said one or more file block components comprising a retrieval target for at least one of said one or more source stages;
   identify one or more physical nodes;
   determine, for each of said one or more physical nodes, a degree value;
   identify one or more qualified physical nodes from said one or more physical nodes having said degree value of one or more;
   create a preferred physical node table, said preferred physical node table comprising, for each of said one or more qualified physical nodes, an identifying indication and an indication of said degree value; and
   sort said preferred physical node table based on said degree value associated with each of said one or more qualified physical nodes.

5. The computer program product of claim 4, wherein said program instructions further comprise instructions to:
   determine a candidate preferred physical node based on each said degree value.

6. The computer program product of claim 5, wherein said program instructions further comprise instructions to:
   determine whether said candidate preferred physical node is available for allocation to said logical node; and
   responsive to said candidate preferred physical node being available for allocation to said logical node, allocate said candidate preferred physical node to said logical node.

7. The computer program product of claim 6, wherein said program instructions further comprise instructions to:
   responsive to said candidate preferred physical node not being available for allocation to said logical node:
      mark said candidate preferred physical node as unavailable for allocation to said logical node; and
      determine an alternative candidate preferred physical node based on each said degree value.

* * * * *